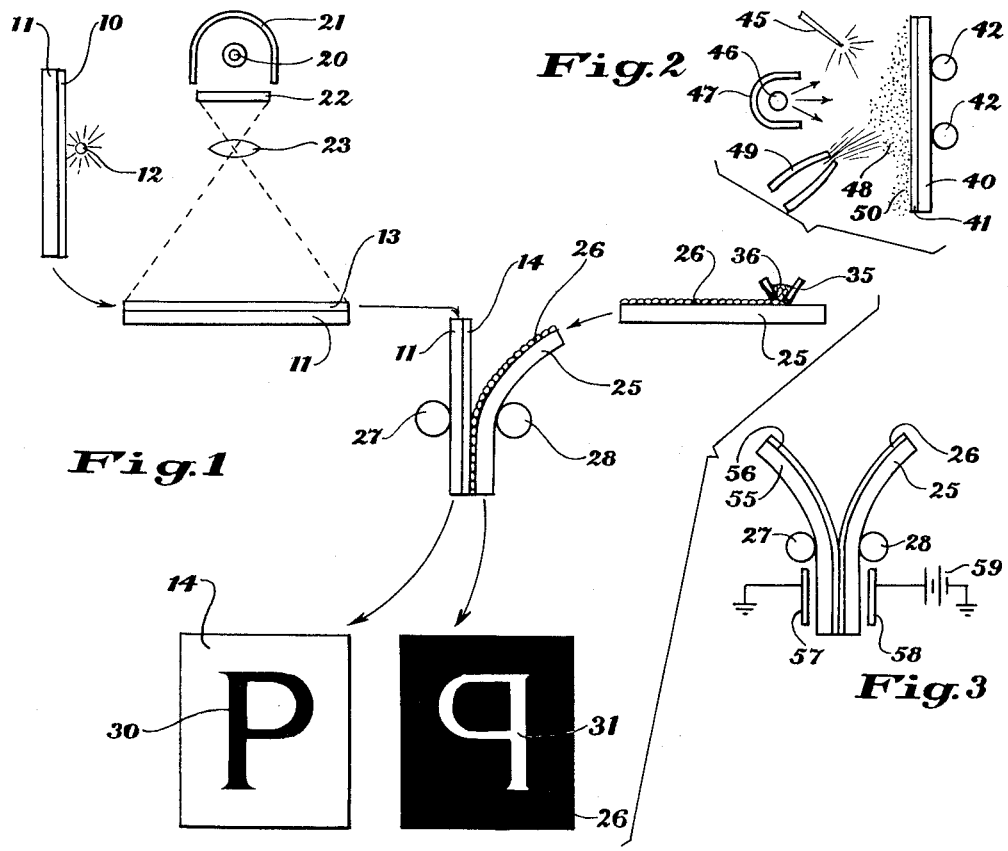
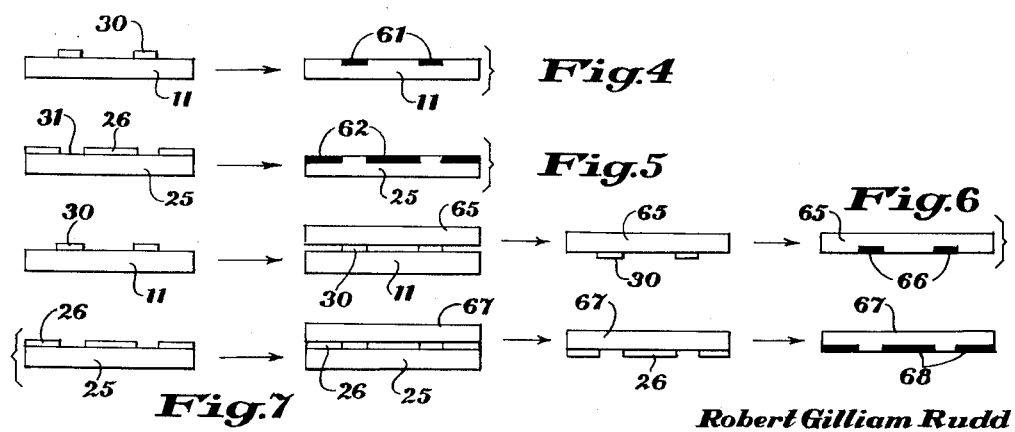

2,996,400
POSITIVE AND NEGATIVE ELECTRO-PRINTING
Robert Gilliam Rudd and James Gordon Jarvis, Rochester, N.Y., assignors to Eastman Kodak Company, Rochester, N.Y., a corporation of New Jersey
Filed Aug. 30, 1956, Ser. No. 607,176
1 Claim. (Cl. 117—17.5)

This invention relates to electrophotography of the type in which an electrostatic image is formed and then converted to a visible image by the application of a pigment or other coloring material in accordance with the electrostatic image.

The invention is applicable to all such processes including those in which the electrostatic image is formed on photoconducting plates or directly on paper or those in which the electrostatic image is eventually converted to a printing plate. It is also applicable to electrostatic printing processes but is not particularly needed in this connection since the printing plate itself can be made up as either a positive or a negative of any desired effective density range. The primary object of the invention is to produce a positive print directly from a negative record or vice versa. One special feature of the invention is that it produces both a positive print and negative print simultaneously. In a preferred embodiment of the invention the quality of both prints is reasonably high. In all embodiments of the invention the quality of the positive print from a negative record is high, and this is useful even if the concurrent negative print is too dense as it may be when an excessive amount of pigment is used on the supply sheet, to be described in detail later.

According to the invention either a positive or a negative print, or both simultaneously, may be printed from a record by the following steps. First, an electrostatic positive image of the record is prepared on a sheet by any of the standard methods. For example, a sheet consisting of a photoconducting layer on a metal plate or paper support is electrostatically charged by passing it close to a high tension wire. Then, an optical image is projected onto the charged surface by a suitable photographic enlarger. The optical image causes the charge in the exposed areas to leak away through the photoconducting layer but to remain in the unexposed areas. Thus, there is an electrostatic positive image of the subject on the sheet. This electrostatic image and sheet are then brought adjacent to a second sheet carrying a uniform, thin layer of powder on the side facing the electrostatic image. The second sheet is brought into contact or very close to the charged sheet. The powder transfers to the charged areas of the first sheet from corresponding areas on the second sheet forming a positive powder image of the subject on the first sheet and leaving a negative powder image on the second sheet. If the uniform, thin layer of powder on the second sheet is too thick the negative image will be too dense. If it is too thin both images will be too light. The use of an electric field across the sandwich to increase the tendency of the powder to transfer to the charged areas of the first sheet usually does more harm than good since it tends to fog the highlights.

Various arrangements of the supply sheet (second sheet) are possible. The sheet itself may be charged or uncharged and the powder particles thereon may be charged or uncharged and may be either an insulator or a conductor. When sheet and powder are both uncharged (but the powder polarizable) the uniformity of the layer of powder is easily disturbed; hence other arrangements are preferable. When the sheet is uncharged but the powder charged (opposite to that of the electrostatic image on the first sheet) the transfer is quite good, but some powder tends to transfer in the highlights giving an overall fog which is sometimes objectionable. When the sheet is charged and the powder uncharged (but polarizable in order to be held by either the supply sheet or the receiving sheet) or when the sheet is charged and the powder charged (opposite to that of the electrostatic image on the first sheet) the transfer is ideal. The powder is shared between the supply sheet and the receiving sheet according to their relative charge densities. The charge on the supply sheet should be the same as on the electrostatic image. The supply sheet may be either an insulating coating on a conductor or a sheet of electrophotographic paper.

Thus the preferred methods use a supply sheet which has been charged before being covered with a uniform layer of either charged (opposite polarity) or polarizable particles. The other methods are operable but may lack uniformity or clear highlights.

In any of the systems, either the positive or negative image is then fused to the sheet it is on or, alternatively it is transferred to a third sheet, at least in part, and then fused to the third sheet. One or other of the prints is laterally inverted (a mirror image) depending on which way the original record is facing when the electrostatic image is formed. The transfer to a third sheet is usually desirable especially in the case of the negative images to remove any veiling over of the clear areas of the image.

Since this invention provides an accurate control of the amount of powder in the negative or positive images, it is particularly useful in processes in which only part of the image is transferred to a third sheet and a plurality of prints are then similarly made by transferring successive parts of the image to a succession of sheets.

Since the quality of the negative image depends directly on the thickness of the powder layer on the supply sheet, it is relatively simple to control the quality. The uniform, thin layer of powder on the supply sheet may be applied thereto by any suitable coating technique. For example, it may be applied from a hopper under which the sheet is moved or it may be sprayed on in a vehicle which completely evaporates. One simple method directly available to those working in electrophotography involves the use of a photoconductive sheet which is either charged and then uniformly partially discharged by a low intensity exposure to control the charge density, or which is continuously charged and continuously illuminated while the powder is applied thereto.

Instead of a photoconductive sheet any dielectric layer (e.g. cellulose acetate on paper or aluminum) on a conducting support may be used. The amount of powder attracted by the layer is determined by the potential to which the layer is elevated. This potential may in turn be regulated by grids in the corona charger, or by the thickness, dielectric constant, and resistivity of the dielectric layer. E.g. in practice a layer of cellulose acetate 0.001 inch thick on an aluminum support will reach equilibrium at a potential of about 600 volts under a corona.

Fortunately, there is a very simple and direct method of measuring the thickness of the powder layer on the supply sheet, if the sheet itself is white or light colored. A thin layer has a low optical density measured by reflection, and a thick layer has a high optical density. The density of colored powder is measured in terms of light complementary thereto as far as the figures discussed below are concerned. If the density of the positive image is to be adequate, the reflection density of the layer on the white supply sheet must be greater than 0.8. In fact, it must be greater than 0.8 for the negative image to have adequate density. If a dark colored support is used for the supply sheet, a light colored monitor may be used when preparing the supply sheet. Alternatively, a standardized coating system is usually set up to provide the necessary thickness of coating without need to make measurements of the optical density or the equivalent density. In this case, it does not matter whether a light colored or a dark colored support is used for this second sheet. Also, this density feature is here discussed only for the usual case where a black or dark pigment is printed on a white or light support, but the same system works where white or light pigment is printed on dark paper. The effective difference in density is the criterion in either case.

In those embodiments in which one is interested only in the so-called negative image, i.e. in which the original record is itself a negative, the thickness of the powder layer on the supply sheet determines the density of the negative print and if this image is to have a useful density with the light areas reasonably clear, the layer of powder on the supply sheet must not be too thick. Thus there is both a lower and an upper limit on the thickness of the layer of powder on the supply sheet. Practically all or at least most of the powder must transfer to the charged image areas; and there is a practical limit on the amount of charge which can be produced in an electrostatic image. Accordingly, it turns out that the maximum useful thickness of the supply layer when a negative print is to be made, is that which on a white support would have a reflection density not greater than a value about 0.1 less than the maximum available with the powder. For example, if the maximum density of a thick layer of powder is 1.4, the layer should be so thin that it has a density less than 1.3. Actual powders in some cases have a maximum density of 1.2 which means the layer must, in this case, have a density less than 1.1. When this is combined with the requirement discussed above which defines a lower limit of 0.8 for both cases, the total useful range for a high quality negative image is 0.8 to 1.1 (or 1.3 as the case may be). The higher quality positive image is obtained with any value of density of the supply sheet between 0.8 and the maximum available with the particular powder used. As mentioned above, transfer of either print to a third sheet gives clearer highlights.

The operation of the invention will be more fully understood from the following description when read in connection with the accompanying drawing in which:

FIG. 1 is a schematic flow chart illustrating the essential steps of the invention;

FIG. 2 similarly illustrates an alternative method of preparing the supply sheet;

FIG. 3 similarly illustrates an alternative method of transferring the powder from the supply sheet to the electrostatic image;

FIGS. 4–7 illustrate various methods for fixing the positive or the negative prints.

In FIG. 1 a photoconductive layer 10 on an electrically conducting support 11 is passed under a wire 12 at high electrical potential to provide a uniform electrostatic charge on the layer 10 which is kept in the dark or under illumination to which the layer 10 is insensitive, during this charging operation. The support may be rigid, for example of metal, or flexible, for example of paper. The conductivity of the support merely has to be adequate to carry off the electrostatic charges when the charged surface 10 is illuminated. This is all well known to those working in electrophotography. As far as the present invention is concerned any of the standard methods for providing a charged surface or the eventual electrostatic image on a sheet, may be used. In the arrangement shown, the charged surface 10 is moved to the position 13. Light from a lamp 20 in a suitable reflector 21 illuminates a positive transparency 22 which hereinafter is referred to as the original record. It could be illuminated by means of an episcope or it could even be an original subject. Light from this record 22 is focussed by a lens 23 to form a positive image on the surface 13.

That is, the areas in the image corresponding to the transparent areas in the subject 22 cause the charge to leak away so that the charge remains only in the areas corresponding to the dark areas of the subject 22. This is referred to as a positive electrostatic image since the charged areas attract powder and become dense so that they, too, appear dark in the areas which were dark in the original record. The electrostatic image is now moved to the position 14. It forms a sandwich with a second sheet consisting of a support 25 carrying a powder layer 26 and the two sheets move between rollers 27 and 28.

Powder from the uniform layer 26 transfers to the charged areas of the layer 14 to form a positive image 30. The remaining powder on the layer 26 forms a negative image 31 since the powder has transferred leaving the white support 25 exposed. If the support 25 is the same color as the powder layer 26, this negative image is not visible, but may be transferred to a white sheet in which case it becomes immediately visible.

If the original record 22 is a negative with respect to the original subject, this image 31 is a positive of the original subject.

The second sheet may be rigid or flexible. It is shown flexible in FIG. 1 and one method of preparing this sheet is also shown in FIG. 1 in which the support 25 moves under a hopper 35 at a uniform speed. Powder 36 in the hopper 35 is spread uniformly to form the layer 26. A somewhat simpler method is to spray an aqueous suspension of the powder onto the sheet allowing the water to evaporate. The relative advantages of having the sheet and powder charged are discussed above.

FIG. 2 illustrates a method of preparing the supply sheet which is quite convenient when one has the equipment commonly used in electrophotography. A photoconducting layer 41 on a support 40 is moved on rollers 42 in front of one or more needles, one of which is shown at 45. Light from a low intensity lamp 46 in a reflector 47 causes the photoconductive layer 41 to be slightly conducting. A powder or dust 48 is applied from a gun 49 and strikes the sheet 41. The powder is charged by a glow discharge from the needle 45 which is connected to a high tension source. This causes some of the charged powder 48 to adhere to the surface 41 in a uniform layer whose thickness increases when the brightness of the lamp 46 is increased. The powder 50 which does not adhere falls away when the layer 41 is vertical or sloped downward at fairly high angle. A still more efficient system of preparing large uniformly coated supply sheets is to charge the electrophotographic sheet in the dark, adjust the potential of the sheet (and hence the subsequent thickness of the deposit) by a controlled flash exposure and then deposit the powder for example by the usual magnetic brush.

The base 40 and the layer 41 thus become the support 25 for a uniform layer of powder 26, as employed in FIG. 1.

FIG. 3 shows an alternative arrangement for the powder transfer step. A flexible support 55 with the photoconductive layer 56 and the electrostatic image thereon, replaces the rigid support 11 and the photoconductive layer 14 of FIG. 1. As before, this first sheet with the electrostatic image is sandwiched with a uniform powder layer 26 between rollers 27 and 28. When desired electrodes 57 and 58 are placed across, i.e. on opposite sides of, the sandwich. A high potential is applied to one of the electrodes from a source schematically indicated at 59. When the electrostatic image on the layer 56 consists of negative charges the electrode 58 is made positive relative to the electrode 57. However it is usually better not to use such an electric field except when transferring an image to a third sheet.

FIGS. 4 and 5 represent the step of fusing the positive and negative images to their respective supports. In FIG. 4 the image 30 on the support 11 is heated until it fuses into the support to form the image 61. In FIG.

5, the residual pigment 26 surrounding the clear area 31 is heated and fused into the support 25 to form the negative print 62.

FIGS. 6 and 7 similarly illustrate an alternative arrangement in which the positive and negative images are transferred to other sheets and then fused to these separate sheets. In FIG. 6 the image 30 is transferred to a white sheet 65 and then fused thereto to form a positive print 66 with exceptionally clear high-lights. In FIG. 1 the positive print 30 appears properly oriented, in which case the print 66 would have lateral inversion. In FIG. 7 the residual powder 26 is transferred to a layer 27 and fused thereto to form the negative print 68. The lateral inversion of the image 31 in FIG. 1 is reversed so that the image 68 appears properly oriented. In either case the orientation depends on which side of the record 22 faces the lens 23 when the original electrostatic image is formed. Hence, no problem is involved in selecting the desired orientation of the image.

We claim:

A method of printing a print from a record which comprises preparing an electrostatic image of the record on a first sheet, coating a second sheet which has approximately the same reflection density as the first sheet with powder whose maximum reflection density differs from that of either sheet by at least 0.9, the coating being to a thickness such that the difference in reflection density between the powder and the second sheet is between 0.8 and a value 0.1 less than the maximum value of said difference, and bringing said first sheet with its electrostatic image adjacent the powder side of the second sheet whereby powder transfers to the charged areas of the first sheet from corresponding areas of the second sheet to form a powder image of the record on the first sheet and also a reversed tone powder image on the second sheet.

References Cited in the file of this patent

UNITED STATES PATENTS

| | | |
|---|---|---|
| 1,658,844 | Hanington | Feb. 14, 1928 |
| 1,784,912 | Scott | Dec. 16, 1930 |
| 2,297,691 | Carlson | Oct. 6, 1942 |
| 2,758,525 | Moncrieff-Yeates | Aug. 14, 1956 |
| 2,761,416 | Carlson | Sept. 4, 1956 |
| 2,803,177 | Lowrie | Aug. 30, 1957 |
| 2,811,465 | Grieg | Oct. 29, 1957 |
| 2,820,716 | Harmon et al. | Jan. 21, 1958 |
| 2,824,813 | Fauser et al. | Feb. 25, 1958 |
| 2,829,025 | Clemens et al. | Apr. 1, 1958 |

FOREIGN PATENTS

| | | |
|---|---|---|
| 16,987 | Great Britain | of 1892 |